United States Patent [19]

Willis

[11] Patent Number: 4,703,341

[45] Date of Patent: Oct. 27, 1987

[54] TELEVISION HAVING LUMA/CHROMA SEPARATION APPARATUS

[75] Inventor: Donald H. Willis, Indianapolis, Ind.

[73] Assignee: RCA Corporation, Princeton, N.J.

[21] Appl. No.: 2,320

[22] Filed: Jan. 12, 1987

[51] Int. Cl.[4] .............................................. H04N 9/78
[52] U.S. Cl. ........................................ 358/31; 358/22
[58] Field of Search ..................................... 358/22, 31

[56] References Cited

U.S. PATENT DOCUMENTS 4,667,222 5/1987 McCoy ................................. 358/31

Primary Examiner—Michael A. Masinick
Attorney, Agent, or Firm—Paul J. Rasmussen; Eric P. Herrmann; Dilip A. Kulkarni

[57] ABSTRACT

A frame comb filter includes a pair of serially-connected field memories. In the normal display mode, the first field memory stores one field of incoming composite video signal CVS and provides a field delayed video signal FDS. The second field memory stores one field of the field delayed video signal FDS and provides a frame delayed video signal FRS2. The incoming composite video signal CVS is combined with the frame delayed video signal FRS2 to generate a Y/C separated component luma signal CLS. In the zoom processing mode, the first field memory stores two fields or one frame of incoming composite video signal corresponding to the zoomed portion of the input image, and provides a frame delayed composite video signal FRS1 at its output. The incoming composite video signal CVS is combined with the frame delayed video signal FRS1 representative of the zoomed portion to produce a Y/C separated component luma signal CLS for the zoomed portion. The second field memory stores two fields or one frame of the Y/C separated luma signal CLS. The reading of the second field memory is coordinated with the horizontal and vertical display deflection circuits to produce the required magnification in the horizontal and vertical directions.

8 Claims, 2 Drawing Figures

Figure 2

|       | 500 | 510 |       |       |       |       |
|-------|-----|-----|-------|-------|-------|-------|
| OF/L1 | $a_{11}$ | $a_{12}$ | $a_{13}$ | $a_{14}$ | $a_{15}$ | $a_{16}$ |
|       | $b_{11}$ | $b_{12}$ | $b_{13}$ | $b_{14}$ | $b_{15}$ | $b_{16}$ — EF/L1 |
| OF/L2 | $a_{21}$ | $a_{22}$ | $a_{23}$ | $a_{24}$ | $a_{25}$ | $a_{26}$ |
|       | $b_{21}$ | $b_{22}$ | $b_{23}$ | $b_{24}$ | $b_{25}$ | $b_{26}$ — EF/L2 |
| OF/L3 | $a_{31}$ | $a_{32}$ | $a_{33}$ | $a_{34}$ | $a_{35}$ | $a_{36}$ |
|       | $b_{31}$ | $b_{32}$ | $b_{33}$ | $b_{34}$ | $b_{35}$ | $b_{36}$ — EF/L3 |

210:

|    | C1 | C2 | C3 | C4 | C5 | C6 |
|----|----|----|----|----|----|----|
| R1 | $a_{23}$ | $a_{24}$ | $b_{23}$ | $b_{24}$ | X | X |
| R2 | X | X | X | X | X | X |
| R3 | X | X | X | X | X | X |

220:

|    | C1 | C2 | C3 | C4 | C5 | C6 |
|----|----|----|----|----|----|----|
| R1 | $a'_{23}$ | $a'_{24}$ | $b'_{23}$ | $b'_{24}$ | X | X |
| R2 | X | X | X | X | X | X |
| R3 | X | X | X | X | X | X |

610, 600:

|       |       |       |       |       |       |       |
|-------|-------|-------|-------|-------|-------|-------|
| OF/L1 | $a'_{23}$ | $a'_{23}$ | $a'_{23}$ | $a'_{24}$ | $a'_{24}$ | $a'_{24}$ |
|       | $b'_{23}$ | $b'_{23}$ | $b'_{23}$ | $b'_{24}$ | $b'_{24}$ | $b'_{24}$ — EF/L1 |
| OF/L2 | $a'_{23}$ | $a'_{23}$ | $a'_{23}$ | $a'_{24}$ | $a'_{24}$ | $a'_{24}$ |
|       | $b'_{23}$ | $b'_{23}$ | $b'_{23}$ | $b'_{24}$ | $b'_{24}$ | $b'_{24}$ — EF/L2 |
| OF/L3 | $a'_{23}$ | $a'_{23}$ | $a'_{23}$ | $a'_{24}$ | $a'_{24}$ | $a'_{24}$ |
|       | $b'_{23}$ | $b'_{23}$ | $b'_{23}$ | $b'_{24}$ | $b'_{24}$ | $b'_{24}$ — EF/L3 |

TELEVISION HAVING LUMA/CHROMA SEPARATION APPARATUS

This invention relates to a Y/C separation apparatus for providing separated component signals (i.e., luma or chroma) during the normal display mode, as well as during the zoom processing mode.

BACKGROUND

In a television receiver, a zoomed picture has a greater need for good luma/chroma (Y/C) separation than a non-zoomed picture. The zoomed image is magnified to occupy the entire display screen, and, therefore, any contamination due to the presence of chroma in the luma channel (and vice versa) becomes more noticeable in the zoom mode.

SUMMARY OF THE INVENTION

In accordance with this invention, a combination frame comb/zoom apparatus is provided. The apparatus includes a frame memory for storing one frame of incoming composite video signal CVS and for generating a frame-delayed video signal FRS2 at its output in the normal display mode. The frame delayed video signal FRS2 is combined with the incoming composite video signal CVS to produce a frame combed component signal FCS (e.g., luma or chroma). In the zoom mode, a first portion of the frame memory (e.g., one field) is used for storing two complete fields or one frame of incoming composite video signal CVS corresponding to the zoomed or fractional portion of the input image to be magnified. The first portion of the frame memory is read out such that its output signal FRS1 is delayed one frame period after it is written into the first memory portion. The frame delayed video signal FRS1 is combined with the non-delayed incoming composite video signal CVS to produce the frame combed component signal FCS for the zoomed portion of the input image. The frame combed component signal FCS corresponding to the zoomed portion is stored in the remaining or second portion of the frame memory. The reading of the remaining memory portion is synchronized with the display deflection circuits to produce the desired enlargement action on the output display screen.

IN THE DRAWINGS

FIG. 1 shows a combination frame comb and zoom apparatus in accordance with the subject invention; and FIG. 2 is a simplified representation of the zoom processing operation pursuant to this invention.

DETAILED DESCRIPTION

Figure 1:
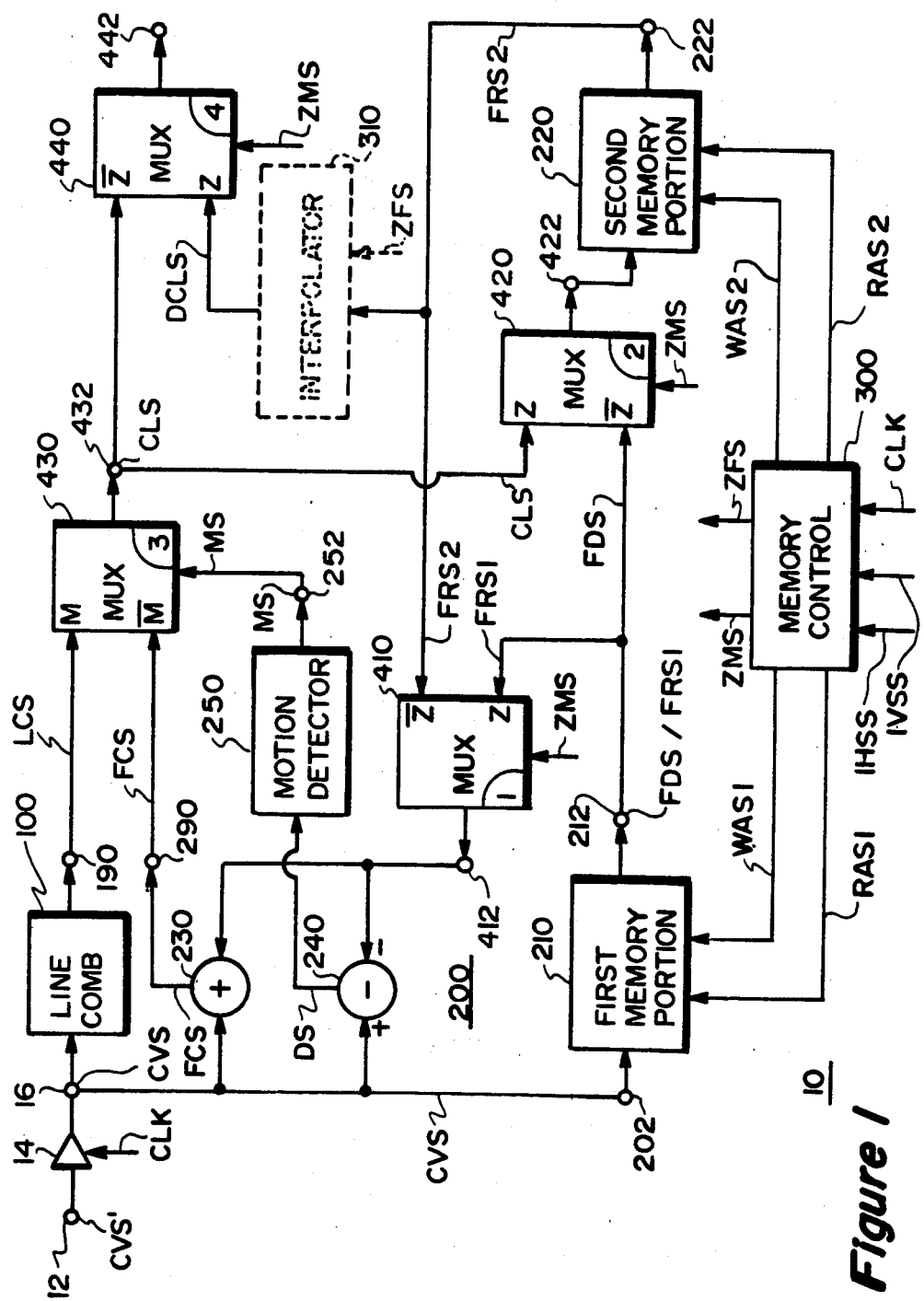

In the DRAWINGS, the lines interconnecting various blocks represent either single conductor connections carrying analog signals or multi-conductor buses carrying multi-bit parallel binary digital signals, as the case may be.

It will be readily appreciated by those skilled in the art of luma/chroma or Y/C separation that the invention may be practiced on either digital or analog representations of the composite video signal CVS. For the purposes of the detailed description, it will be assumed herein that the composite video signal is an 8-bit binary digital signal unless otherwise stated, and that the video signal is in the NTSC format.

FIG. 1 represents a combination frame comb/zoom apparatus 10 for the luma channel of a conventional TV receiver. This apparatus functions as a motion-adaptive frame comb in the normal display mode. Similar arrangement may be used for the chroma channel of the TV receiver.

An interlaced composite color video signal CVS' in the NTSC format—for example, which may be derived from a conventional TV tuner/detector circuit—is applied to the input terminal 12 of an analog-to-digital (A/D) converter 14. The composite video signal CVS' consists of successive picture frames occurring at the rate of 30 frames a second. Each frame, in turn, comprises an odd field A formed by a first plurality of horizontal lines of picture information and an even field B defined by a second plurality of horizontal picture information lines. The second plurality of horizontal lines are interlaced between the first plurality of horizontal lines as is well known in the TV art. The total number of horizontal line periods in each frame period is 525 in the NTSC system. Becuase of vertical blanking intervals between successive fields, there are only 485 usable or displayable lines in each frame period.

The A/D converter 14 is clocked with a sampling clock signal CLK occurring at 4, for example, times the color subcarrier frequency (i.e., $4F_{sc}$). Each line of the input image defined by the incoming video signal CVS is divided into discrete picture elements or pixels. Each picture element is separately converted into a digital signal sample representing the amplitude of that particular picture element. The phase of the sampling signal CLK is adjusted with respect to the phase of the color subcarrier signal $F_{sc}$ (and then locked therewith). so as to produce 8-bit binary digital samples CVS at the output terminal 16 thereof in the following manner:

$$(Y+Q)'_{n-1},(Y+I)'_{n-1},(Y-Q)'_{n-1},(Y-I)'_{n-1},(Y+Q)'_{n-1} \quad (1)$$

$$(Y-Q)'_n,(Y-I)'_n,(Y+Q)'_n,(Y+I)'_n,(Y-Q)'_n \quad (2)$$

$$(Y+Q)'_{n+1},(Y+I)'_{n+1},(Y-Q)'_{n+1},(Y-I)'_{n},(Y+Q)'_{n+1} \quad (3)$$

etc. In the above sample stream, Y represents the luminance component of the composite video signal CVS, and I and Q represent the color difference contributions of the chrominance component (C) of the composite video signal. The subscripts $n-1$, $n$ and $n+1$ respectively denote successive horizontal scan lines of a given field. The single prime indicates that the foregoing samples represent an odd frame A. In the NTSC format, the chrominance component (C) is 180° out of phase on a line-to-line basis within a given field.

The sample stream CVS from the next following frame is given below:

$$(Y-Q)''_{n-1},(Y-I)''_{n-1},(Y+Q)''_{n-1},(Y+I)''_{n-1},(Y-Q)''_{n-1} \quad (4)$$

$$(Y+Q)''_n,(Y+I)''_n,(Y-Q)''_n,(Y-I)''_n,(Y+Q)''_n \quad (5)$$

$$(Y-Q)''_{n+1},(Y-I)''_{n+1},(Y+Q)''_{n+1},(Y+I)''_{n+1},(Y-Q)''_{n+1} \quad (6)$$

etc. The double prime indicates that the samples are from the even frame B. The symbols Y, I, Q and n are defined as for the preceding frame. The chrominance component (C) is 180° out of phase on a frame-to-frame basis.

The composite video signal CVS in the digital format at the terminal 16 is applied to a line comb filter 100 and a frame comb filter 200. The line comb filter 100 generates a line combed version LCS of the luminance component Y of the composite video signal CVS at its output terminal 190. The frame comb filter 200 produces a frame combed version FCS of the luminance component Y at its output terminal 290. The output signals from the line comb filter 100 and the frame comb filter 200 are applied to a multiplexor 430. The multiplexor 430 applies either the line combed signal LCS or the frame combed signal FCS to its output terminal 432 depending on whether or not interframe image motion is present.

The line comb filter 100 includes means for combining the incoming video signal CVS with a 1−H delayed video signal (i.e., delayed by one horizontal line period) to generate a line interpolated signal LIS [i.e., 0.5 $(L_n+L_{n-1})$] at the output thereof. The chroma components are cancelled in the output of the combining means due to the 180° chroma phase relationship between the adjacent scan lines, and the luma components therein are reinforced. The line comb filter 100 further includes means for adding the luminance vertical detail [i.e., 0.5 $(L_n-L_{n-1})_{LPF}$] to the line interpolated signal LIS to produce the line combed signal LCS given by the following equation:

$$LCS = 0.5(L_n+L_{n-1}) + 0.5(L_n-L_{n-1})_{LPF} \quad (7)$$

In the above equation, $L_n$ and $L_{n-1}$ represent vertically aligned pixels from adjacent horizontal lines.

The frame comb filter 200 includes a frame memory comprising a first field memory 210 and a second field memory 220, serially connected to the first field memory 210 via a multiplexor 420. Memory control means 300, coupled to the frame memory and responsive to the incoming horizontal and vertical synchronizing signals IHSS and IVSS (which may be supplied by conventional TV sync separation circuits), generates first and second sets of write and read address signals for controlling the writing and reading operations of the first and second field memories respectively.

The memory control means 300 additionally provides two other signals—a zoom mode indicative signal ZMS and a zoom factor signal ZFS, which are under the control of the user. The zoom mode indicative signal ZMS is a 1-bit binary signal, which is a logical one when the TV apparatus is in the zoom processing mode. Otherwise, the ZMS signal is set equal to a logical zero. The zoom factor ZFS represents magnification of the zoomed or targeted portion in each of the linear dimensions (i.e., horizontal and vertical).

The counters included in the memory control means 300 generate the respective address signals during the normal display mode in response to the IHSS and IVSS signals in a known fashion. In the zoom mode, the counters are programmed by the user input signals (ZFS and ZMS) to provide the starting/stopping addresses for each line in the raster in the manner explained later.

In the normal display mode, the first field memory 210, responsive to a first set of write and read address signals NWAS1 and NRAS1, stores one field of incoming video signal CVS, and provides a field delayed video signal FDS at its output terminal 212 for application to the second field memory 220. The second field memory 220, responsive to a second set of write and read address signals NWAS2 and NRAS2, stores one field of the field delayed signal FDS, and provides a frame delayed video signal FRS2 at the output terminal 222. The total delay introduced by the two cascade-connected field memories 210 and 220 is equal to 525 horizontal line periods or one frame period between the input terminal 16 and the output terminal 222.

The incoming video signal CVS is added to the frame delayed video signal FRS2 in an adder 230 in the normal display mode. Because of the 180° phase relationship between the respective samples of the successive frames, the chrominance components cancel, thereby leaving only the luminance component in the output signal FCS at the terminal 290 of the frame comb filter 200. The equation for the frame combed signal FCS is as follows:

$$FCS = 0.5(CVS+FRS2) \quad (8)$$

In the above equation, CVS and FRS2 represent spatially coterminous pixels from consecutive frames.

A subtracter 240 subtracts the frame delayed video signal FRS2 from the incoming non-delayed video signal CVS to generate a difference signal DS indicative of scene motion occurring between images from consecutive frames. A motion detector 250 processes the difference signal DS to generate an interframe motion signal MS at the output terminal 252 thereof.

The motion signal MS is a 1-bit binary signal. When the interframe image motion is detected, the motion signal MS is set equal to logical one. When the interframe image motion is absent, the motion signal MS is set equal to logical zero. Any one of many known interframe image motion detectors may be implemented for the motion detector 250.

The line combed signal LCS and the frame combed signal FCS are applied to the input terminals of the multiplexor 430. The multiplexor 430, responsive to the motion signal MS, passes the line combed signal LCS to the output terminal 432 when motion is present, and passes the frame combed signal FCS to its output terminal when motion is absent. The combed luminance signal (LCS of FCS or a combination thereof) at the output of the multiplexor 430 is designated as CLS.

In this particular embodiment, each of the field memories 210 and 220 is a semiconductor device with sufficient storage cells to store 8-bit data words representing one field of video signal. Since the picture information is not present during the horizontal and vertical blanking intervals of the incoming video signal, it is not necessary to store 910 pixels per horizontal line (i.e., 4 $F_{sc}/F_H$) and 262½ horizontal lines per vertical sync period (i.e., 525/2). Each of the field memories 210 and 220 have capacity to store 768 pixels per horizontal line and 256 horizontal lines per vertical field period. The data words are stored in separate memory locations or cells, each of which is assigned a different address.

For an enlargement or a zoom factor ZF of 1.4142 ($\sqrt{2}$) to 1 (linear dimension), storage capacity needed to store one complete field of video signal corresponding to the fractional zoomed (or targeted) portion of the input image is given by the following relationship:

$$\text{Storage capacity} = \frac{768}{1.4142} \times \frac{256}{1.4142} \text{ cells} \quad (9)$$

$$= 0.5 \ (768 \times 256) \text{ cells}$$

= 0.5 (Field Memory)

Two complete fields of video signal corresponding to the zoomed portion can be stored in each of the field memories 210 and 220 without any additional cropping of the margins if the zoom factor ZF is equal to or greater than 1.4142 ($\sqrt{2}$). If the zoom factor ZF is 2 to 1, only one half of one field memory (768×256 cells) is needed to store two complete fields of the zoomed signal.

In the zoom mode, the first field memory 210, responsive to a further set of write and read address signals ZWAS1 and ZRAS1, stores two fields of incoming composite video signal CVS corresponding to the zoomed portion of the input image, and provides a frame delayed video signal FRS1 at its output terminal 212. A multiplexor 410 has an output terminal 412 coupled to the respective input terminals of the adder 230 and the subtracter 240, and has its input terminals coupled for receiving the respective outputs FRS1 and FRS2 of the first and second field memories 210 and 220. The multiplexor 410, responsive to the zoom signal ZMS, couples the second frame delayed video signal FRS2 from the second field memory 220 to the adder 230 and the subtractor 240 in the normal display mode. The multiplexor 410 couples the first frame delayed video signal FRS1 from the first field memory 210 to the adder 230 and the subtracter 240 in the zoom mode.

The adder 230 adds the incoming video signal CVS to the frame delayed video signal FRS1 to generate the frame combed signal FCS corresponding to the zoomed portion of the input image defined by the incoming video signal in the zoom mode. The subtracter 240 subtracts the frame delayed video signal FRS1 from the incoming video signal CVS to generate the difference signal DS. The motion detector 250, responsive to the difference signal DS, produces the motion signal MS indicative of interframe motion in the manner described above, while the TV apparatus is in the zoom mode.

The multiplexor 430, responsive to the motion signal MS, applies either the line combed signal LCS or the frame combed signal FCS to its output terminal 432 depending upon whether or not interframe motion is present. Another multiplexor 420 has an output terminal 422 coupled to the second field memory 220, and has input terminals coupled to the output terminals 212 and 432 of the first field memory 210 and the multiplex or 430 respectively. The multiplexor 420, responsive to the zoom signal ZMS, couples the raw or non-separated field delayed video signal FDS to the second field memory 220 in the normal display mode, and couples the combed luminance signal CLS to the second field memory in the zoom mode.

In the zoom mode, the second field memory 220, responsive to the write address signal ZWAS2, stores two complete fields of combed luminance signal LCS corresponding to the zoomed portion of the input image. The reading of the second field memory 220 is synchronized with the display deflection circuitry (not shown) by a read address signal ZRAS2 in a manner that stretches a zoomed portion 510 of an input image 500 to fill the entire output screen 610 of a display device 600, as indicated in FIG. 2.

FIG. 2 is a conceptual representation of the operation of the field memories 210 and 220 in the zoom mode. The input image 500 is defined by two interlaced fields A and B. The odd or upper field A is defined by a total of 18 picture elements: $a_{11}, a_{12} \ldots a_{16}, a_{21}, a_{22} \ldots a_{26}, a_{31}, a_{32} \ldots a_{36}$. The even or lower field B is similarly formed by a total of 18 picture elements: $b_{11}, b_{12} \ldots b_{16}, b_{21}, b_{22} \ldots b_{26}, b_{31}, b_{32} \ldots b_{36}$. A zoomed portion 510 is defined by the picture elements $a_{23}$ and $a_{24}$ from the odd field A and the elements $b_{23}$ and $b_{24}$ from the even field B of the input image 500. The zoomed portion 510 represents a zoom factor ZF of 3 to 1.

In this example, each of the field memories 210 and 220 has capacity to store one full field or 18 picture elements of the video signal. In the zoom mode, the first field memory 210 stores two fields or one frame of raw or non-separated video signal corresponding to the zoomed portion 510 (i.e., the picture elements $a_{23}, a_{24}, b_{23}$ and $b_{24}$). The second field memory 220, on the other hand, stores two fields or one frame of a frame period delayed and Y/C separated video signal representative of the zoomed portion 510 (i.e., the picture elements $a'_{23}, a'_{24}, b'_{23}$ and $b'_{24}$).

The second field memory 220 is read out such that every picture element of the zoomed portion 510 is repeated three (3) times to extend the zoomed portion horizontally, and each row in the zoomed portion is repeated three (3) times to stretch the zoomed portion in the vertical direction. A multiplexor 440, responsive to the zoom signal ZMS, couples to its output port 442 the combed luminance signal CLS from the output of the multiplexor 430 in the normal display mode and the delayed combed luminance signal DCLS corresponding to the zoomed portion 510 of the input image 500 from the output of the second field memory 220 in the zoom mode.

The output of the multiplexor 440 produces an enlarged picture on the display screen 610 of the kinescope 600. The top left picture element $a'_{23}$ in the zoomed portion 510 is repeated three times horizontally and vertically to define a set of nine (9) picture elements. Similarly, other picture elements $a'_{24}, b'_{23}$ and $b'_{24}$ are repeated nine (9) times each to fill the remaining display screen 610 as shown.

When the zoom factor ZF is a non-integer number, it is desirable to use a suitable interpolation algorithm for generating interpolated samples from the original samples in the zoomed portion 510 in a manner that assures correct spatial positioning of the interpolated picture elements. The interpolator is identified in FIG. 1 by a dashed line block 310.

The memory write and read generating arrangement will now be described. The memory address consists of the column or pixel address component and the row or line address component. In the normal display mode, the video signals are written into the field memories 210 and 220 at the 4 $F_{sc}$ rate and read out therefrom a field period later at the same rate. To this end, the column write and read address components start with each horizontal sync pulse IHSP and are incremented by every clock pulse CLP. The row write and read address components, on the other hand, start with each vertical sync pulse IVSP and are incremented by each horizontal sync pulse IHSP.

In the normal display mode, there is one-to-one mapping between the picture points in the input image or raster 500 and the locations or cells in the field memories 210 and 220. As an even field B is written into the first field memory 210, the immediately preceding odd field A is transferred to the second field memory 220, and the next immediately preceding even field from the previous frame is read out from the second field memory. One field period delay is produced between the respective output and input signals of each of the first and second field memories 210 and 220.

The write and read address signals NWAS1, NRAS1 and NWAS2, NRAS2 for the first and second field memories 210 and 220 are all identical in the normal display mode. U.S. Pat. No. 4,266,240, entitled, "TELEVISION SPECIAL EFFECTS ARRANGEMENT", describes an arrangement for generating memory write and read addresses for a frame memory.

The mapping of the zoomed portion 510 of the input image 500 in the first field memory 210 will now be explained with the help of FIG. 2. It will be assumed that the memory 210 is arranged as rows and columns in a matrix form. The first pixel ($a_{23}$) on the first line (OF/L2) of the odd field A defining the zoomed portion 510 is assigned the first address in the first row of the first field memory 210. The second pixel ($a_{24}$) is assigned the next following address. After all the pixels on the first line of the odd field A of the zoomed portion 510 are assigned addresses, the first pixel on the second line of the odd field of the zoomed portion is assigned the next consecutive address. The second pixel on the second line of the odd field A in the zoomed portion 510 is assigned the next following address, and so on.

After all the pixels in the odd field A defining the zoomed portion 510 are assigned addresses, the first pixel ($b_{23}$) in the first line of the even field B of the zoomed portion (EF/L2) is given the next consecutive address. The second pixel ($b_{24}$) on the first line (EF/L2) in the even field B in the zoomed portion 510 is given the next following address. This process continues until all the pixels in the even field B of the zoomed portion 510 are assigned successive addresses.

In the zoom mode (unlike the normal display mode), the picture information is not continuously written into the field memory 210. The writing operation is suspended between the occurrence of:

The first pixel $a_{11}$ in the input image 510 and the first pixel ($a_{23}$) in the zoomed portion 510.

The last pixel on a given line in the odd field A of the zoomed portion 510 and the first pixel on the next following line in the odd field of the zoomed portion.

The last pixel ($a_{24}$) on the last line (OF/L2) in the odd field A of the zoomed portion 510 and the first pixel ($b_{23}$) on the first line (EF/L2) in the even field B of the zoomed portion.

The last pixel on a given line in the even field B of the zoomed portion 510 and the first pixel on the next consecutive line in the even field of the zoomed portion.

The last pixel ($b_{24}$) on the last line (EF/L2) in the even field B of the zoomed portion 510 and the first pixel ($a_{23}$) on the first line (OF/L2) in the odd field A of the zoomed portion.

The column and row write address signal components in the zoom mode are set equal to their respective lowest possible values at a point in time in the input image 500 corresponding to the first pixel ($a_{23}$) on the first line (OF/L2) in the odd field A of the zoomed portion 510. The column addresses are incremented during the period the picture information is written into the field memory 210 at each clock pulse CLP. When the last memory location in a given row of the field memory 210 is written into, the row address is incremented by one unit and the column address is reset to the lowest possible value.

In the zoom mode, all the pixels in the odd field A of the zoomed portion 510 are recorded first at successive memory locations in the first field memory 210. After recording the odd field A of the zoomed portion 510, all the pixels in the even field B of the zoomed portion are recorded therein in succession.

In the zoom mode, the information is read out from the first field memory 210 in the same manner as it is written into it. The read address signal ZRAS1 is the same as the write address signal ZWAS1. Before new pixel information is written into a given memory location, the previous pixel information in that particular location is read out. A frame period delay is produced between the input signal CVS and the output signal FRS1 of the first field memory 210 in the zoom mode, as is previously indicated.

The mapping of the zoomed portion 510 in the second field memory 220 in the zoom mode is identical to that of the first field memory 210. The second field memory 220 is likewise arranged as rows and columns in a matrix form. The write address signal ZWAS2 for the second field memory 220 in the zoom mode is the same as the write and read address signals ZWAS1 and ZRAS1 for the first field memory 210.

It will be noted that writing of the first and second field memories 210 and 220 and the reading of the first field memory are sporadic in the zoom processing mode. For a zoom factor of 2 to 1, the first and second field memories 210 and 220 are each written only 25% of the time. Similarly, the first field memory 210 is read out during 25% of the time only. Although the information is written into and read out of the first field memory 210 only a part of the time, it is written into and read out at the 4 $F_{sc}$ rate while the TV receiver is in the zoom processing mode.

The reading of the second field memory 220 during the zoom processing operation is coordinated with the horizontal and vertical deflection circuits of the television apparatus. The pixels from the second field memory 220 are read out slowly—both horizontally and vertically. For a 3-to-1 zoom, each sample is repeated three times to extend the zoomed portion 510 horizontally. Similarly, each horizontal line is read out three times to stretch the zoomed portion 510 vertically. This produces the requisite 3-to-1 expansion of the zoomed portion 510 to fill the entire output screen 610 in the manner indicated in FIG. 2. It is noted that the reading of the second field memory 220 is carried out continuously, although it is written into intermittently.

For a 3-to-1 zoom, the read address signal ZRAS2 for the second field memory 220 is generated as follows. All the pixels in the odd field A are read out first. The column and row address components of the read address signal ZRAS2 are set equal to their respective lowest possible values at the occurrence of each odd vertical sync pulse IVSP. The column address is incremented once every 3 clock pulses CLP's. After the last memory location in a given row of the second field memory 220 is read out, the row address is incremented by one and the column address is reset to its lowest possible value.

At the occurrence of each horizontal sync pulse IHSP, the column and row addresses are reset to the respective column and row addresses of the first pixel in that particular line until that line is read out three times. Once every three horizontal sync pulses IHSP's, the column and row addresses are set equal to the respective column and row addresses of the first pixel on the next following line in the odd field A of the zoomed portion 510.

All the pixels in the odd field A are read out from the second field memory 220 in this manner. After all the pixels in the odd field A are read out, the pixels in the even field B are read out as follows.

At the occurrence of each even vertical sync pulse IVSP, the column and row addresses are set equal to the respective column and row addresses of the first pixel ($b_{23}$) on the first line (EF/L2) of the even field B of the zoomed portion 510. The column address is advanced once every three clock pulses CLP's. After the last memory location in a given row of the second field memory 220 is read out, the row address is incremented and the column address is reset to its lowest possible value.

At the occurrence of each horizontal sync pulse IHSP, the column and row addresses are reset to the respective addresses of the first pixel in that particular line until that line is read out three times. Once every three horizontal sync pulses IHSP's, the column and row addresses are set equal to the respective addresses of the first pixel on the next consecutive line in the even field B of the zoomed portion 510.

At the occurrence of each odd vertical sync pulse, the horizontal and vertical addresses are reset to their respective lowest possible values. The cycle is then repeated. The output display screen 610 in FIG. 2 shows the order in which the output samples are generated.

FIGS. 1 and 2 describe a luma/chroma separation apparatus 10 that provides a Y/C separated signal for the luminance channel of the TV receiver—both during the normal display mode and the zoom processing mode. A similar arrangement may be added for providing a Y/C separated chroma signal during the normal display mode and the zoom processing mode.

What is claimed is:

1. A television apparatus for separating at least one of the luminance and chrominance components from an interlaced composite video signal CVS consisting of successive picture frames; each of said frames consisting of a first field defining a first plurality of horizontal lines of picture information and a second field defining a second plurality of horizontal lines of picture information interposed between said first plurality of picture information lines; said incoming composite video signal including periodic horizontal and vertical synchronizing signals IHSS and IVSS disposed between successive lines and fields of picture information, respectively; said apparatus comprising:

an input port for applying said incoming composite video signal CVS;

a source of zoom mode indicative signal ZMS having a first value when said apparatus is in the normal display mode and a second value when said apparatus is in the zoom processing mode;

a frame memory having a first portion and a second portion; said first memory portion having an input terminal coupled for receiving said composite video signal CVS and having an output terminal; said second memory portion having an input terminal coupled for receiving the output of said first memory portion and having an output terminal;

memory control means coupled to said frame memory and responsive to said horizontal and vertical synchronizing signals IHSS and IVSS for generating first and second sets of write and read address signals for controlling the writing and reading operations of said first and second memory portions, respectively—both during the normal display mode and during the zoom processing mode;

said first memory portion, responsive to said first set of write and read address signals, storing one field of said incoming video signal CVS and providing a field delayed video signal FDS at its output terminal in the normal display mode; said first memory portion, responsive to said first set of write and read address signals, storing one frame of the video signal representative of the zoomed portion of said incoming video signal and providing a frame delayed video signal FRS1 at its output terminal in the zoom processing mode;

said second memory portion, responsive to said second set of write and read address signals, storing one field of said field delay video signal FDS, and providing a frame delayed video signal FRS2 at its output terminal in the normal display mode;

means for combining said incoming composite video signal CVS with the respective one of said frame delayed composite video signals FRS1 and FRS2 to produce a frame combed video signal FCS representative of the frame combed version of said separated component;

first switching means having an output terminal coupled to said combining means and further having a pair of input terminals coupled for receiving the respective one of said first and second frame delayed video signals FRS1 and FRS2; said first switching means, responsive to said zoom mode indicative signal ZMS, selectively coupling to said combining means said first frame delayed video signal FRS1 in the zoom processing mode and said second frame delayed video signal FRS2 in the normal display mode;

second switching means having an output terminal coupled to said second memory portion and further having a pair of input terminals coupled for receiving the respective one of said frame combed signal FCS and said field delayed video signal FDS; said second switching means, responsive to said zoom mode indicative signal ZMS, selectively coupling to said second memory portion said frame combed signal FCS in the zoom processing mode and said field delayed video signal FDS in the normal display mode;

said second memory portion, responsive to said second set of write and read address signals, storing said combed signal FCS representative of said zoomed portion of said input image, and providing said combed signal FCS at its output terminal in the zoom processing mode.

2. The apparatus defined in claim 1 wherein each of said first and second memory portions is a field memory; the first one of said field memories storing one field of said incoming video signal CVS, and providing said field delayed video signal FDS at its output in the normal display mode; said first field memory storing two fields or one frame of said incoming video signal corresponding to the zoomed portion of said input image, and providing said first frame delayed video signal FRS1 at its output in the zoom processing mode; the second one of said field memories storing one field of said field delayed video signal FDS, and providing said second frame delayed video signal FRS2 at its output terminal in the normal display mode; said second field memory storing two fields or one frame of said frame combed video signal FCS corresponding to the zoomed portion of said input image, and providing said frame combed video signal FCS at its output in the zoom processing mode.

3. The apparatus defined in claim 2 wherein the zoom factor, representative of the enlargement required, is equal to or greater than $\sqrt{2}$ to 1 in each of the horizontal and vertical directions, so that two fields or one frame video signal representative of the zoomed portion of said incoming video signal can be stored in each of said field memories without any additional cropping of the input image.

4. The apparatus defined in claim 2 further including:
line combing means coupled to said input port for receiving said incoming video signal CVS for generating a line combed signal LCS representative of the line combed version of said at least one separated component;
motion detecting means having input terminals coupled for receiving said incoming video signal CVS and the respective one of said frame delayed video signals FRS1 and FRS2 for generating an interframe motion signal MS; and
third switching means having an output terminal at which a combed component signal CS is available, and further having input terminals coupled for receiving the respective one of said line combed signal LCS and said frame combed signal FCS; said third switching means, responsive to said motion signal MS, selectively coupling said line combed signal LCS or said frame combed signal FCS to its output terminal;
wherein said input terminals of said second switching means are coupled for receiving said combed component signal CS and said field delayed video signal FDS.

5. The apparatus defined in claim 4 further including fourth switching means having an output port, and further having a pair of input terminals coupled for receiving the respective one of said combed component signal CS and the output of said second field memory; said fourth switching means, responsive to said zoom mode indicative signal ZMS, selectively coupling to said output port said combed component signal CS in the normal display mode and said output of said second field memory in the zoom processing mode.

6. The apparatus defined in claim 5 further including zoom processing means having an input terminal coupled for receiving said output of said second field memory, and further having an output terminal coupled to the respective one of said input terminals of said fourth switching means; said zoom processing means generating spatially interpolated samples from the original samples to fill the entire output screen.

7. A television apparatus for separating at least one of the luminance and chrominance components from a composite video signal CVS consisting of successive picture frames; said incoming composite video signal including periodic horizontal and vertical synchronizing signals IHSS and IVSS disposed between successive lines and fields or frames of picture information, respectively; said apparatus comprising:
an input port for applying said incoming composite video signal CVS;
a source of zoom mode indicative signal ZMS having a first value when said apparatus is in the normal display mode and a second value when said apparatus is in the zoom processing mode;
a frame memory, coupled to said input port, having a first portion and a second portion; each of said first and second memory portions having an input terminal and an output terminal;
memory control means coupled to said frame memory and responsive to said horizontal and vertical synchronizing signals IHSS and IVSS for generating first and second sets of write and read address signals for controlling the writing and reading operations of said first and second memory portions, respectively—both during the normal display mode and the zoom processing mode;
said first memory portion, responsive to said first set of write and read address signals, storing one frame of the incoming composite video signal representative of the zoomed portion and providing a first frame delayed composite video signal FRS1 at its output terminal in the zoom processing mode;
said frame memory, responsive to said write and read address signals, storing one frame of said incoming composite video signal CVS and providing a second frame delayed composite video signal FRS2 in the normal display mode;
means for combining said incoming composite video signal CVS with the respective one of said frame delayed composite video signals FRS1 and FRS2 to produce a frame combed video signal FCS representative of the frame combed version of said separated component;
first switching means having an output terminal coupled to said combining means and further having a pair of input terminals coupled for receiving the respective one of said first and second frame delayed composite video signals FRS1 and FRS2; said first switching means, responsive to said zoom mode indicative signal ZMS, selectively coupling to said combining means said first frame delayed composite video signal FRS1 in the zoom processing mode and said second frame delayed composite video signal FRS2 in the normal display mode;
second switching means having an output terminal coupled to said second memory portion and further having an input terminal coupled for receiving said frame combed signal FCS; said second switching means, responsive to said zoom mode indicative signal ZMS, coupling said frame combed signal FCS to said second memory portion in the zoom processing mode; and
said second memory portion, responsive to said second set of write and read address signals, storing said frame combed signal FCS representative of said zoomed portion of said input image, and providing said frame combed signal FCS at its output terminal in the zoom processing mode.

8. The television apparatus defined in claim 7 for processing an interlaced composite video signal CVS consisting of successive picture frames; wherein each of said frames consists of a first field defining a first plurality of horizontal lines of picture information and a second field defining a second plurality of horizontal lines of picture information interposed between said first plurality of picture information lines; wherein said first memory portion, responsive to said first set of write and read address signals, stores one field of said incoming video signal CVS and provides a field delayed video signal FDS at its output terminal in the normal display mode; wherein said second switching has a pair of input terminals respectively coupled for receiving said frame combed signal FCS and said field delayed video signal FDS; wherein said second switching means, responsive to said zoom mode indicative signal ZMS, selectively couples to said second memory portion said frame combed signal FCS in the zoom processing mode and said field delayed video signal FDS in the normal display mode; wherein said second memory portion, responsive to said second set of write and read address signals, stores one field of said field delayed video signal FDS, and provides said second frame delayed composite video signal FRS2 at its output terminal in the normal display mode.

* * * * *